June 12, 1962     E. W. D'ARCY     3,039,022
MOTION PICTURE PROJECTOR

Filed Nov. 5, 1954     3 Sheets-Sheet 1

Inventor:
ELLIS W. D'ARCY
By Robert F. Miehle, Atty.

June 12, 1962  E. W. D'ARCY  3,039,022
MOTION PICTURE PROJECTOR
Filed Nov. 5, 1954  3 Sheets-Sheet 2

Inventor:
ELLIS W. D'ARCY
By Robert F. Miehle, Atty.

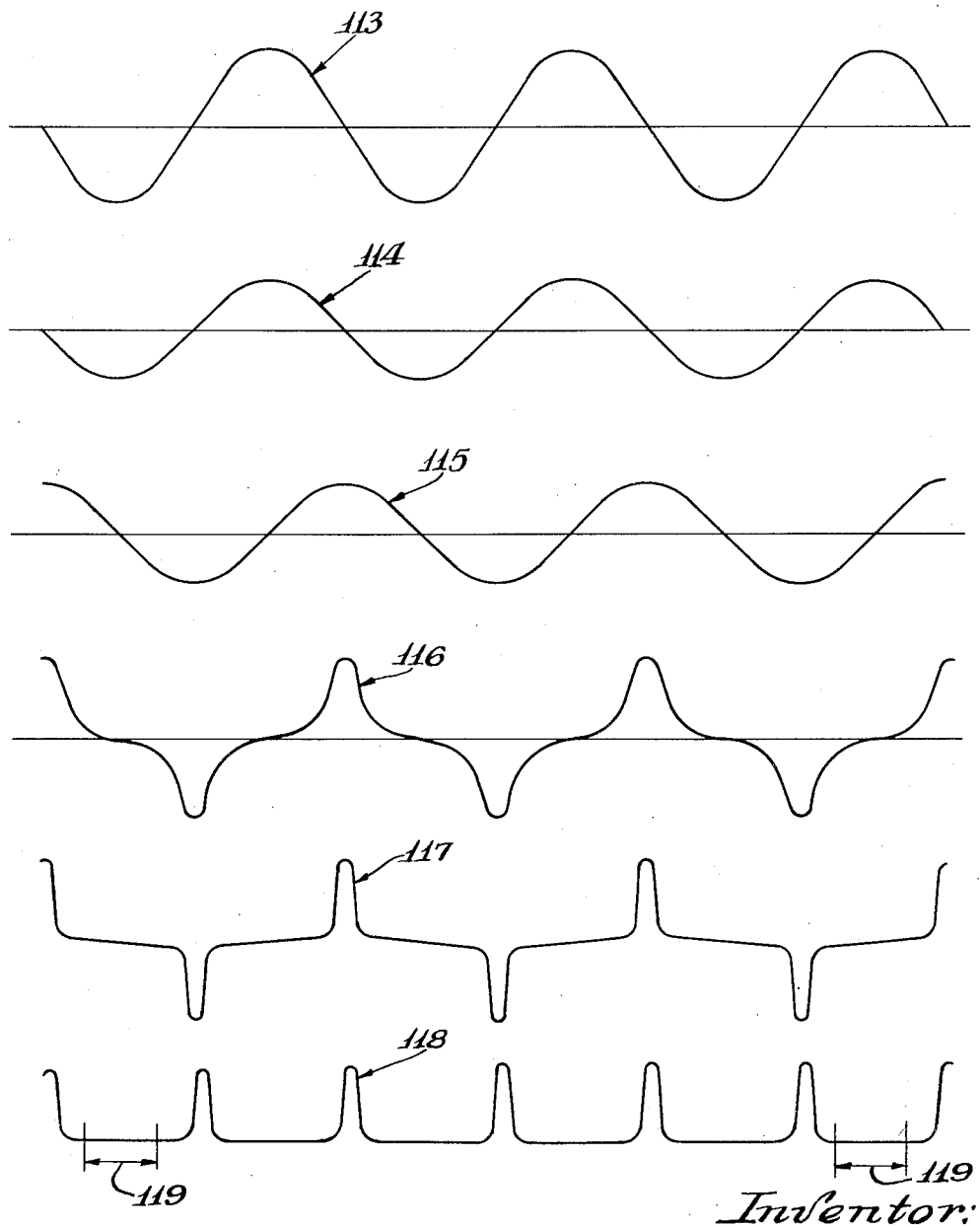

United States Patent Office 3,039,022
Patented June 12, 1962

3,039,022
MOTION PICTURE PROJECTOR
Ellis W. D'Arcy, 7045 N. Osceola Ave., Chicago 31, Ill.
Filed Nov. 5, 1954, Ser. No. 467,072
5 Claims. (Cl. 315—278)

This invention relates to a motion picture projector and more particularly to a motion picture projector utilizing a light source having a pulse output to eliminate the need for a mechanical shutter.

In a motion picture projector constructed in accordance with the principles of this invention, a light source is operated from an alternating current supply line and is arranged to produce a pulse output during each cycle of the supply line current, and motion picture film is intermittently advanced through a region in the path of the light from the light source at a rate equal to the repetition rate of the light pulses divided by an integer number. By advancing the film during time periods between pulses, there will be no flicker or blur that might otherwise result from projection of light through the film with the film in motion, and the need for a shutter is obviated.

Preferably, the light source may produce two output pulses during each cycle of the supply line current and it has been discovered that such an output is obtained with a light source in the form of a gaseous discharge device having a pair of electrodes supported in an ionizable gaseous medium. Xenon has been found to be a particularly suitable gaseous medium. When such electrodes are energized from the alternating current supply line under the proper conditions, the source will automatically produce a pulse output during each half cycle of the supply line current. It may be noted that the term "pulse output" as used herein means that the preponderant portion of the output light energy is produced during periods of duration less than the duration of one half cycle of the supply line current.

It has been discovered that this system is particularly applicable to projectors designed for standard supply line frequencies and frame repetition rates. The standard supply line frequency in this country is 60 cycles per second and a standard frame repetition rate is 24 frames per second. With a light source such as above described which produces two pulses of light output during each cycle of the supply line current, the pulse repetition rate with a supply line frequency of 60 cycles will be equal to 120 pulses per second. This is an integer multiple (5) of the standard 24 frames per second repetition rate.

To insure operation of the light source in synchronism with the intermittent film advancing means, the film advancing means is controlled from the supply line, preferably through a suitable synchronous electric motor. It may be noted that with this arrangement, the pulse output of the light source and the film advancing means are automatically synchronized through the supply line and no separate synchronizing means is required. Proper phasing of the light source and the film advancing means may be accomplished through an electrical phase shifter between the supply line and either the light source or the synchronous motor, or through physical adjustment of the position of the synchronous motor or the connection therefrom to the film advancing mechanism.

An important feature of the invention is in the provision of means for developing a pulse of current through a discharge device such as above described to produce a corresponding output light pulse of relatively short duration. According to this feature, circuit means coupled to the discharge device are connected in series with a saturable reactor between a pair of alternating current supply lines. Under proper conditions of operation, this simple circuit will develop current pulses for developing the desired light pulses.

A specific feature of this pulsing circuit is in the provision of a capacitor connected across the saturable reactor which under proper conditions will shorten the duration of and increase the intensity of the current pulses. It is, of course, important that the light pulses be of short enough duration that the film can be advanced between pulses.

Another important feature of the present invention is in a ballast arrangement for automatically starting and operating a gaseous discharge device or the like. A gaseous discharge device such as above described requires a relatively high ignition voltage to obtain ionization of the gaseous medium and thereafter a relatively low operating voltage is required to prevent excessive current through the device. The ballast arrangement of this invention utilizes a transformer having at least two windings each of which is coupled between alternating current supply lines with the discharge device being connected in the circuit with one of such windings. The circuit and transformer action are such that a high voltage is developed during low load starting conditions, but a low operating voltage is developed when the discharge device presents a high load (that is, a low impedance). Preferably, two transformer windings are connected in series with the pulse-forming saturable reactor between the supply lines with the discharge device being coupled to one of such windings, and with a third transformer winding connected in series with a capacitor between the supply lines. A specific feature of this arrangement is that the pulse-forming saturable reactor is used as a functioning element of the ballast circuit.

To aid in igniting the discharge device, use is preferably made of a high frequency current which may be obtained from a step-up transformer and spark gap in a manner as will be described in detail hereinafter. To minimize production of static interferences, and for safety reasons, it is desirable that this high frequency ignition circuit be located closely adjacent the discharge device or lamp with leads as short as possible. In accordance with a further specific feature of the invention, the discharge device or lamp is disposed in a suitable housing on the projector, and the high frequency circuit components are mounted on a hinged door for such housing.

A still further feature of the invention is in the provision of an interlock switch arranged to be actuated when the door of the lamp housing is opened to deenergize the electrical circuit.

An object of this invention, accordingly, is to provide an improved motion picture projector utilizing a light source having a pulse output to eliminate the need for a mechanical shutter.

Another object of this invention is to provide improved means for developing short duration current pulses through a gaseous discharge device or the like.

A further object of this invention is to provide an improved ballast arrangement for automatically initiating operation of a gaseous discharge device or the like.

This invention contemplates other objects, features and advantages which will become more fully apparent from the following detailed description taken in conjunction with the accompanying drawings which illustrate a preferred embodiment and in which:

FIGURE 4 illustrates wave forms useful in understanding and analysis of the operation of the projector.

Figure 1:
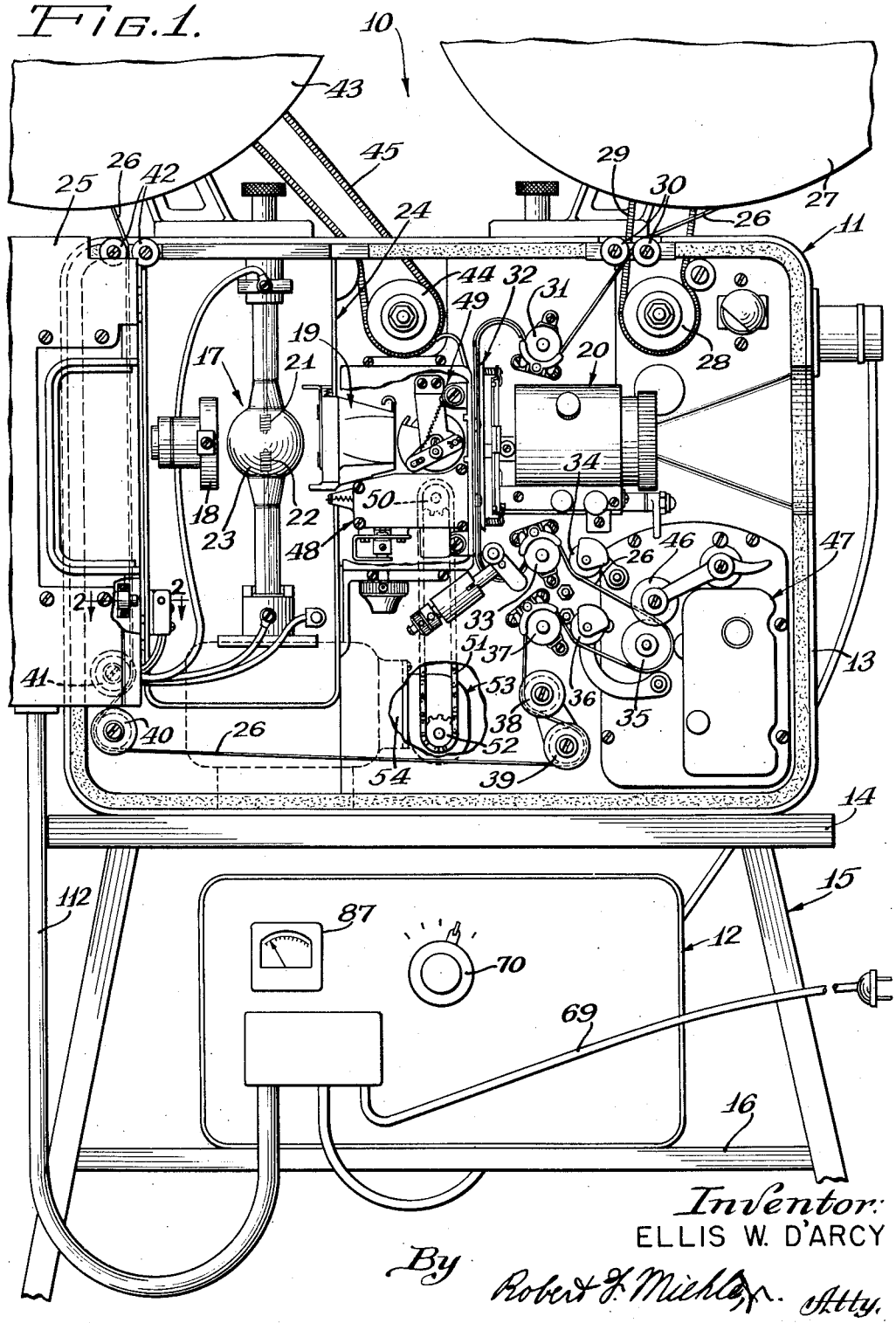
FIGURE 1 is a side elevational view of a motion picture projector and associated electrical control unit constructed in accordance with the principles of this invention.

Reference numeral 10 generally designates a motion picture projection system constructed in accordance with the principles of this invention, which system may comprise a projector 11 and an electrical control unit 12. The projector unit 11 may comprise a suitable cabinet 13 and may be supported on the top 14 of a table 15 with the electrical control unit 12 being supported on a shelf 16 of the table 15.

A light source 17 on the projector unit 11 may have a reflector 18 supported therebehind and may be arranged to project light through a condenser lens 19 and a projector lens unit 20 to a screen or the like. The light source 17 may preferably be a gaseous discharge device including a pair of electrodes 21 and 22 within an envelope 23 of glass or other transparent material filled with an ionizable gaseous medium, preferably xenon. The source 17 may be mounted within a housing 24 on the unit 11 having a hinged door 25 shown in its open position in FIGURE 1. The source 17 may be energized through electrical control apparatus, a portion of which is mounted on the door 25 with the remaining portions thereof within the electrical control unit 12. In a manner as will be described in detail hereinafter, the light source 17 may produce flashes or pulses of light at a certain rate which may, for example, be 120 pulses per second.

Motion picture film 26 may travel from a supply reel 27, driven from a pulley 28 through a belt 29, between a pair of guide rollers 30, thence about a first drive sprocket 31, thence through a guide structure 32 in the path of the light from the source 17, thence about a second drive sprocket 33, under an idler roller 34, thence about a capstan 35, under an idler roller 36, about a third drive sprocket 37, between guide rollers 38 and 39, thence between guide rollers 40 and 41 upwardly and between guide rollers 42 to a take-up reel 43 driven from a pulley 44 through a belt 45.

The film 26 may be urged against the capstan 35 by a pinch roller 46 and the capstan 35 may be coupled directly to a fly wheel (not shown) so as to rotate at a constant velocity and insure constant linear speed of the film, with a sound head 47 being arranged to reproduce sound from a sound track on the film.

Travel of the film 26 through the path of light from the light source 17 is controlled by a gate mechanism 48 which, according to this invention, advances the film intermittently at a rate equal to the rate of the pulse output from the light source 17 divided by an integer number. By advancing the film during time periods between the light pulses, there will be no flicker or blur that might otherwise result from projection of light through the film with the film in motion, and the need for a shutter is obviated. The projector unit 11 may, however, be equipped with a shutter mechanism 49 so as to be usable with conventional light sources, if such should be desired.

The gate mechanism 48 may include a sprocket 50 meshed with a drive chain 51 which is also meshed with a sprocket 52 driven through a worm gear speed reduction unit 53 from a motor 54, preferably a synchronous electric motor driven from the same supply lines as those used to energize the light source 17. The drive of the pulleys 28 and 44 and sprockets 31, 33 and 37 is not shown, but it will be understood that they are driven from the sprocket 50 by suitable couplings in the projector unit 11. Any suitable film drive and guide mechanisms of the prior art may, of course, be used in the practice of this invention.

Figure 3:
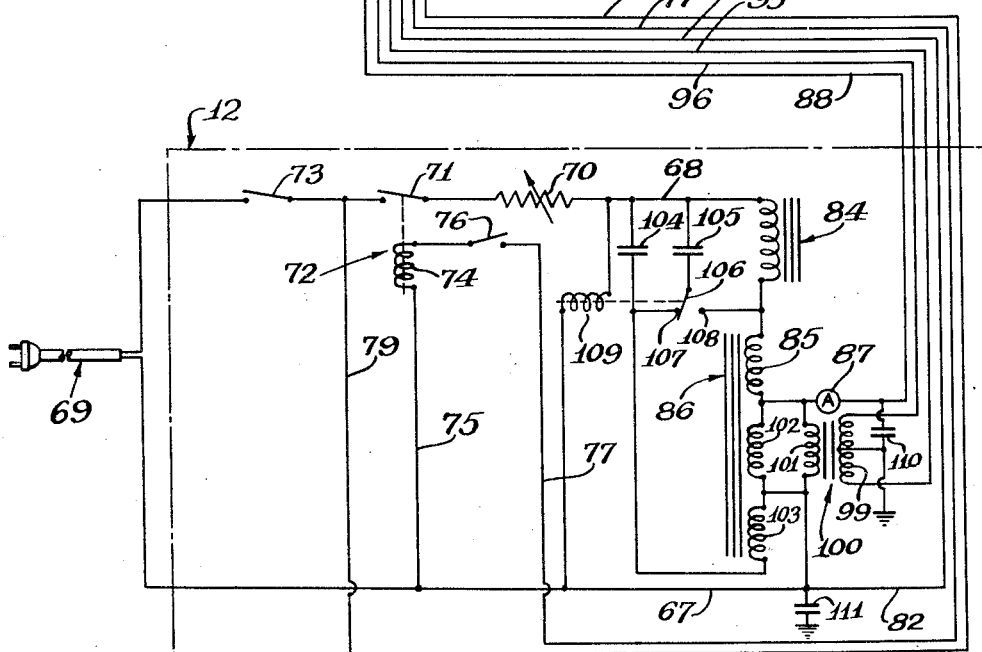
FIGURE 3 is a schematic diagram illustrating the electrical circuit and portions of the film-advancing structure of the projector of FIGURE 1.

As shown in FIGURE 3, the worm gear speed reduction unit 53 may comprise a worm 55 meshed with a worm wheel 56 coupled through a shaft 57 to the sprocket 52, and the gate mechanism 48 may include a shuttle 58 having fingers 59 engageable in holes of the film 26, the shuttle 58 being movable toward the film 26 to engage the fingers 59 therewith under the control of a cam 60, and being pivotal about a pin 61 under the control of a cam 62. A tension spring 63 may urge the shuttle 58 away from the film 26. The cam 62 may be driven from the sprocket 50 through a shaft 64 and the cam 60 may be driven at a reduced rate with respect to the drive of the cam 62 through reduction gears 65 and 66. The operation is such that in every third revolution of the shaft 64, the shuttle 58 will be moved to the right to engage the fingers 59 in the film holes and the shuttle 58 will at the same time pivot clockwise about the pin 61 under the control of the cam 62 to advance the film 26. This intermittent advance may take place at the rate of 24 per second, a standard frame repetition rate.

The electrical control unit 12 may comprise a pair of supply lines 67 and 68 arranged for connection through a line cord 69 to a source of electricity, such as a source of 60 cycle, 120 volt alternating current. The supply line 67 may be connected directly to one conductor of the line cord while the line 68 may be connected through a line voltage adjustment rheostat 70, a contact 71 of a contactor 72 and a switch 73 to the other conductor of the line cord 69. The contactor 72 may comprise a coil 74 for magnetically operating the contact 71, one terminal of the coil 74 being connected through a conductor 75 to the supply line 67 and the other terminal of the coil 74 being connected through a switch 76, through a conductor 77, through an interlock switch 78 at the lamp housing 24, and back through a conductor 79 to the junction between the contact 71 of the contactor 72 and the main on-off switch 73.

Figure 2:
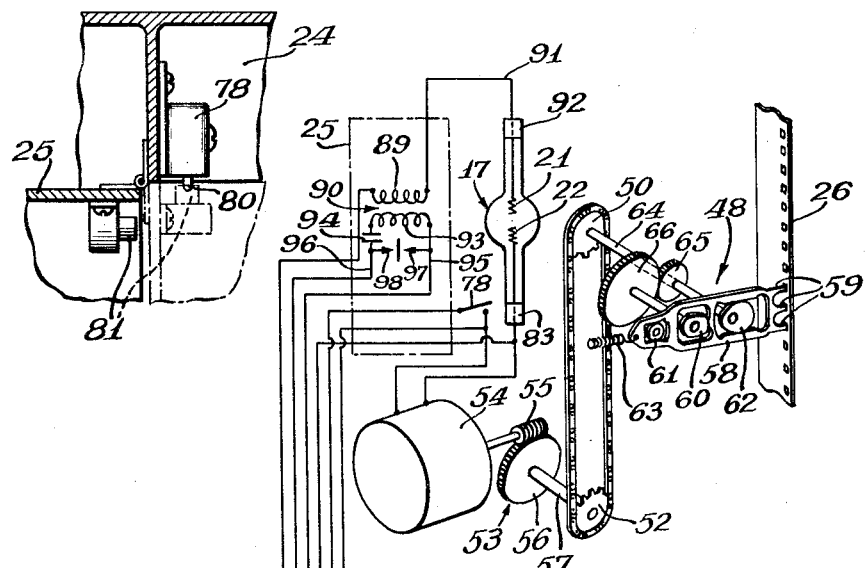
FIGURE 2 is a sectional view taken substantially along line II—II of FIGURE 1 and illustrating the details of an interlock switch arrangement of this invention.

As illustrated in FIGURES 1 and 2, the interlock switch 78 may be in the form of a micro-switch having an actuating button 80 and it may be mounted on the inside of one wall of the lamp housing 24 in a position such that the button 80 may be engaged by an actuator 81 carried by the door 25 of the lamp housing 24 when the door 25 is closed, the switch 78 being closed when the door 25 is closed. With the door 25 closed, with the switch 73 closed and with the line cord 69 connected to a source of electricity, the switch 76 may be closed to energize the coil 74 and close the contact 71 of the contactor 72 to thus energize the supply lines 67—68.

The supply line 67 may be connected through a conductor 82 to a terminal 83 on the light source 17 connected to the electrode 22 and the supply line 68 may be connected through a pulse-forming saturable reactor 84, through a winding 85 of a transformer 86, through an ammeter 87, through a conductor 88, through a secondary winding of a high frequency transformer 90 and through a conductor 91 to a terminal 92 on the light source 17 connected to the electrode 21.

The high frequency transformer 90 may have a primary winding 93 connected in series with a capacitor 94 between conductors 95 and 96 with spark gap contacts 97 and 98 connected respectively to the conductors 95 and 96 and with the conductors 95 and 96 connected to opposite ends of a secondary winding 99 of a high voltage transformer 100 having a primary 101 connected between the supply line 67 and the junction between transformer winding 85 and ammeter 87.

A second winding 102 of the transformer 86 may be connected in parallel with the primary 101 of the high frequency transformer 100 and a third winding 103 of the transformer 86 may be connected in series with a capacitor 104 between the supply line 67 and the supply line 68. A second capacitor 105 may have one terminal connected to the supply line 68 with its other terminal connected to a movable relay contact 106 selectively engageable with a contact 107 connected to the junction between capacitor 104 and transformer winding 103 and a contact 108 connected to the junction between reactor 84 and transformer winding 85, so that the capacitor 105 may be selectively connected either in parallel with the capacitor 104 or in parallel with the reactor 84. The contact 106 may be manually actuated between such positions, or may be normally in the position illustrated and actuated by a relay coil 109 connected between the supply lines 67 and 68. The operation may be such that the contact 106 is shifted from the position illustrated into the position in engagement with the contact 108 upon the elapse of a predetermined time period after energization of the coil 109.

To minimize static interferences, the secondary winding 99 of the high voltage transformer 100 may have a center tap connected to ground, the conductor 88 may be connected through a capacitor 110 to ground, and the supply line 67 may be connected through a capacitor 111 to ground.

It should be noted that the high frequency transformer 90 and the spark gap contacts 97 and 98 are carried by the door 25 of the lamp housing and a cable 112 extending from the door 25 to the electrical control unit 12 may contain the conductors 77, 79, 82, 88, 95 and 96. The motor 54 may preferably be connected between the conductors 79 and 82.

*Operation*

In operation, the line cord may be connected to a source of electricity such as a source of 60 cycle, 120 volt alternating current and the switch 73 may be closed. This will permit energization of the motor 54. The switch 76 may then be closed and, assuming that the door 25 of the lamp housing is closed so as to close the interlock switch 78, the coil 74 of the contactor 72 will be energized to close the contact 71 and apply voltage to the supply lines 67 and 68.

The relay coil 109 will be energized, but as previously indicated, the operation may be such that the contact 106 will remain in the position illustrated in contact with the contact 107 until the elapse of a certain time interval. The capacitors 104 and 105 will thus be connected in parallel with each other and in series with the transformer winding 103 between the supply lines 67 and 68. The capacitance of the capacitors 104 and 105 may be such relative to the inductance of the transformer winding 103 as to provide a series circuit operating at close to a resonant condition so as to provide a fairly large current flow through the winding 103 and so as to develop a relatively high voltage thereacross.

By a transformer action, a relatively large voltage will be developed across the transformer winding 102 which will be applied across the lamp 17 and also across the winding 101 of the high voltage transformer 100. A large voltage will be developed across the secondary winding 99 of the high voltage transformer 100 which voltage is applied across the spark gap contacts 97, 98 to cause arcing therebetween. Such arcing will induce high frequency currents in the series circuit including the capacitor 94 and the primary winding 93 of the high frequency transformer 90, and such series circuit may be resonant at a relatively high frequency so as to develop a high frequency current of substantial magnitude in the secondary winding 89 of the high frequency transformer 90. This high frequency voltage and the high voltage developed across secondary winding 102 of the transformer 86 in series therewith, are applied across the electrodes 21, 22 of the lamp 17 and as a result of these voltages, the gaseous medium in the lamp 17 will start to ionize to allow conduction of current between the electrodes 21, 22.

When the lamp 17 starts to conduct, there will be increased current through the windings 85 and 102 of the transformer 86 and, through transformer action, a voltage will be induced in the transformer winding 103 which will oppose the current flow from the supply line 68 through capacitors 104, 105 and the winding 103 to the supply line 67 to reduce the voltage across winding 103 and reduce the voltage across winding 102 and hence the voltage applied to the lamp 17. As ionization of the lamp 17 increases, this action will continue until a stable operating condition is reached wherein the voltage across winding 102 and hence the voltage across the lamp 17 will be relatively low and the current through the lamp will not be excessive.

It should be noted that when the voltage across winding 102 decreases below a certain value, the voltage induced in the secondary 99 of the high voltage transformer 100 will not be sufficient to form an arc between the spark gap contacts 97, 98 and hence the high frequency ignition circuit will be automatically rendered inoperative.

As noted above, increased current through the windings 85 and 102 caused by conduction of the lamp 17 will induce a voltage in the transformer winding 103 opposing the current flow from the supply line 86 through capacitors 104, 105 and the winding 103 to the supply line 67. This may ultimately result in a reversal of current through the winding 103 and a circulating current from the winding 103 through capacitors 104, 105, reactor 84 and windings 85 and 102, which circulating current will tend to oppose any change in lamp current.

Whether or not such reversal of current takes place, the current through the winding 103 during operating conditions will be substantially less than the current therethrough during starting conditions, and the parameters of the circuit are preferably such that with the high starting currents, the iron of the transformer 86 is operated beyond the "knee" of the B—H curve so that the inductance of the winding 103 may be relatively low, but with the reduced current flow obtained during operating conditions, the iron will be operated closer to the "knee" of the B—H curve and the inductance of the winding 103 will be relatively high. As previously indicated, the series circuit including the capacitors 104, 105 and the winding 103 is operated at close to resonant conditions during the starting operation, and with the increase inductance of the winding 103 obtained during operating conditions, this circuit may operate at a point removed from the resonant condition, so as to reduce the current flow therethrough.

Current flow through the winding 103 may be further increased by switching the capacitor 105 out of circuit therewith, which may be accomplished either manually or automatically by the time delay action of the relay coil 109 previously described.

The action of the pulse-forming saturable reactor 84 is an important feature of the present invention. In a manner as will be described in detail, this reactor acts to provide current pulses through the lamp 17 of relatively short duration and, in addition, it is a functioning element of the automatic starting circuit in that it provides a substantial impedance beween the winding 85 and the supply line 68 to permit development of a relatively large starting voltage across the transformer winding 102.

To further illustrate the operation of the starting circuit, some typical voltages obtained during starting and operating conditions might be mentioned. In one circuit, in which the winding 85 has 58 turns, the winding 102 has 148 turns and the winding 103 has 540 turns, with the reactor 84 having 175 turns and with the total capacitance of capacitors 104 and 105 being 20 microfarads, with a xenon lamp arranged to operate at approximately 900 volt-amperes and with 115 volts between the supply lines 67, 68, the voltages and currents during starting and operating conditions were as follows:

|  | Starting Conditions | Operating Conditions |
|---|---|---|
| Voltage across Winding 103 | 430 | 100 |
| Voltage across Winding 102 | 140 | 30 |
| Voltage across Winding 85 | 60 | 13 |
| Voltage across Reactor 84 | 55 | 120 |
| Voltage across Capacitors 104-105 | 540 | 140 |
| Current through Winding 103 | 7.5 | 3 |
| Current through Reactor 84 | 4.5 | 18 |
| Current through Winding 102 | 2.0 | 12 |
| Supply line current | 12.0 | 15 |

It may be noted that the current through the winding 103 during operating conditions was reversed with respect to the current during starting conditions. It will be observed that with this circuit, a voltage of 140 volts is obtained across the transformer winding 102 for starting operation with a voltage of 30 volts for operation of the lamp 17 after ignition. It will be appreciated that these values are given only for the purpose of illustration and are not to be construed as limitations.

As has been previously indicated, the formation of current pulses through the saturable reactor 84 is a highly important feature of this invention. In this circuit, the reactor 84 is in series with the transformer windings 85 and 102 which are coupled to the device 17. The reactance of the reactor 84 will be reduced when flux is increased beyond the "knee" of the B—H curve and current flow will be correspondingly increased to produce current peaking. It has been found that for effective operation of this circuit, the impedance (average) of the reactance 84 should be a substantial portion of the total impedance of the series circuit, and preferably the impedance of the reactor 84 should constitute the preponderant portion of the total impedance. Stated in other terms, the voltage across the reactor 84 should be a substantial portion and preferably a preponderant portion of the supply voltage. Assuming that the applied voltage is sinusoidal, the instantaneous voltage between the supply lines 67, 68 may be considered equal to $e = E \sin wt$ and may have a form as indicated by reference numeral 113 in FIGURE 4. The induced voltage in the reactor 84 will be substantially equal to $$N \frac{d\Phi}{dt}$$

where N is the number of times and $\phi$ is the flux, and it may be assumed that this induced voltage is substantially equal to the applied voltage so that $$N \frac{d\Phi}{dt} = E \sin wt$$

and $$\frac{d\Phi}{dt} = \frac{E}{N} \sin wt$$

Hence, $$\frac{d\Phi}{dt}$$

is of sinusoidal form and may have a form as indicated by reference numeral 114 in FIGURE 4. If $$\frac{d\Phi}{dt}$$

has a value as indicated, $\Phi$ will be equal to:

$$-\frac{E}{NW} \cos wt$$

and may have a form as indicated by reference numeral 115 in FIGURE 4.

The current required to obtain a flux of the form indicated may be readily determined from the B—H curve for the reactor 84 and if the maximum flux is beyond the "knee" of the B—H curve, the current will have a peaked form such as indicated by reference numeral 116 in FIGURE 4.

This current wave form is satisfactory, but differs from the ideal wave form in that there is some current flow between the peaks, which might cause a corresponding light output. It has been found that a current wave form closer to the ideal wave form is produced with a capacitor connected across the terminals of the reactor. A wave form produced by the capacitor 105 connected across the reactor 84 is indicated by reference numeral 117 in FIGURE 4.

The light output produced with the application of such a current wave form is indicated by reference numeral 118 in FIGURE 4 and it will be observed that there are two pulses of light output during each cycle of the supply line current. Hence, if the supply line frequency is 60 cycles per second, the light pulses will be produced at a rate of 120 per second. If a 24 second frame rate is desired, the film may be advanced following every fifth light pulse, as during time periods as indicated by reference numeral 119 in FIGURE 4.

The capacitance which should be connected across the reactor 84 may be determined by a Fourier analysis of the ideal wave form and the wave form produced without the capacitance, either graphically or through a wave analyzer. In a particular case, it was found that the fundamental frequency should be left about the same, the third harmonic reduced slightly, the fifth harmonic reduced considerably and shifted 180° in phase and the seventh harmonic reduced slightly and shifted 180° in phase. Such was achieved by providing a capacitance of a value such that a condition of resonance appeared at a frequency between the third and fifth harmonics, but closer to the fifth harmonic.

In general, a wave form closer to the ideal wave form will be produced by changing the magnitude and phase of the third and higher harmonics, and the optimum value of the capacitance can be determined experimentally, as by observing the wave form on an oscilloscope and adjusting the value of the capacitance to resonate the circuit through the range of such harmonics until the desired wave form is achieved.

With values such as previously described, it is found that an excellent wave form is achieved with the value of the capacitance 105 equal to 16 microfarads. It will be noted that the capacitance 105 thus serves the dual function of tuning the circuit including winding 103 during starting conditions, and tuning the reactor 84 during operating conditions. This is important because the capacitor for each purpose must have a relatively large value and correspondingly large size, weight and cost. Further, it is of advantage to decrease the capacitance in the circuit including winding 103 after the lamp 17 is ionized, as heretofore pointed out.

It will thus be appreciated that this invention provides a motion picture projector utilizing a light source having a pulse output to eliminate the need for a shutter and which incorporates improved ballast and pulse-forming circuits for a gaseous discharge device or the like.

It will be understood that modifications and variations may be effected without departing from the scope of the novel concepts of the present invention.

I claim as my invention:

1. A circuit arrangement for providing pulse operation of a gaseous discharge device, comprising: a gaseous discharge device; an auto transformer having at least two windings; a condenser connected in series with one of said windings; means affording connection of said condenser and winding in series to a source of A.C. voltage; means affording connection of the remainder of said windings to the same source of A.C. voltage; means connecting said device to the secondary of said auto transformer; and a high frequency resonant circuit inductively coupled to said auto transformer and said device for supplying an R.F. voltage to said device, during the striking thereof.

2. The combination defined by claim 1 in which said high frequency resonant circuit comprises a spark gap connected in a closed loop with a coil and condenser.

3. The combination defined by claim 1 and including a saturable reactor connected in series with said remainder of said auto transformer windings.

4. The combination defined by claim 1 in which said auto transformer comprises three windings on a common core: a saturable reactor connected in series circuit with two of said windings; means affording connection of said circuit to a source of A.C. voltage; a condenser connected in a second series circuit with the other of said three windings; and means affording connection of said second series circuit to the same A.C. voltage source.

5. A circuit arrangement for providing pulse operation of a gaseous discharge device, comprising: a gaseous discharge device; an auto transformer having three windings on a common core; a capacitor connected in a first series circuit with one of said windings and to a source of A.C. voltage; a saturable reactor connected in a second series circuit with the other two of said windings and to the same A.C. voltage source; means including secondary winding of a pulse transformer connecting said gaseous discharge device directly across one of said two windings; and a high frequency oscillatory circuit including the primary winding of said pulse transformer, said circuit being inductively coupled to said one of said two windings.

References Cited in the file of this patent

UNITED STATES PATENTS

| 1,206,984 | Bloom | Dec. 5, 1916 |
| 1,489,332 | Outrey | Apr. 8, 1924 |
| 1,728,003 | Nickle | Sept. 10, 1929 |
| 1,739,498 | Beck | Dec. 17, 1929 |
| 1,930,123 | Ewest et al. | Oct. 10, 1933 |
| 1,958,475 | Frappier et al. | May 15, 1934 |
| 1,994,305 | Dorgelo | Mar. 12, 1935 |
| 2,030,426 | Blok | Feb. 11, 1936 |
| 2,186,013 | Edgerton | Jan. 9, 1940 |
| 2,292,064 | Dorgelo et al. | Aug. 4, 1942 |
| 2,351,616 | Karash et al. | June 20, 1944 |
| 2,557,809 | Willoughby | June 19, 1951 |
| 2,671,377 | Downes et al. | Mar. 9, 1954 |

FOREIGN PATENTS

| 249,787 | Great Britain | Apr. 1, 1926 |
| 462,884 | Germany | July 19, 1928 |